Patented Feb. 23, 1954

2,670,372

UNITED STATES PATENT OFFICE 2,670,372

N-DIALKYLAMINOALKYL-N-CYCLOALKYL-CYCLOALKYLALKANAMIDES

John W. Cusic, Skokie, Ill., assignor to G. D. Searle & Co., Chicago, Ill., a corporation of Illinois No Drawing. Application July 23, 1952, Serial No. 300,509

13 Claims. (Cl. 260—557)

The present invention relates to a group of new organic compounds and in particular to the N - dialkylaminoalkyl - N - cycloalkyl - cycloalkylalkanamides of the structural formula

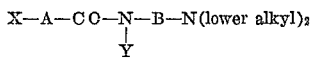

and the non-toxic salts thereof, wherein X and Y are lower cycloalkyl groups and A and B are bivalent saturated aliphatic hydrocarbon radicals. In the foregoing structural formula X and Y represent cycloalkyl radicals containing 3 to 6 nuclear carbon atoms such as cyclopropyl, cyclobutyl, cyclopentyl, and cyclohexyl radicals as well as their nuclearly lower alkylated derivatives such as methylcyclopentyl, ethylcyclohexyl, propylcyclohexyl and the like. The radicals A and B represent bivalent saturated aliphatic hydrocarbon radicals such as ethylene, propylene, butylene, amylene, hexylene and polymethylene radicals such as trimethylene, tetramethylene and octamethylene. While the radical A can also be a methylene radical, the radical B must contain at least two carbon atoms separating the two nitrogen atoms attached thereto. The lower alkyl radicals of the dialkylamino group can be methyl, ethyl, propyl, butyl, amyl and hexyl, wherein the propyl, butyl, amyl and hexyl groups may be of the straight chained or branch chained type. Valuable compounds are also obtained where the radical N(lower alkyl)₂ is replaced by heterocyclic groups such as N-piperidino, N-lupetidine, N-pyrrolidino, N-morpholino, N'-alkyl-N-piperazino and like radicals.

The organic bases of the foregoing type form salts which are non-toxic in therapeutic dosage with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide. By this quaternization procedure valuable ganglion blocking and depressor agents are obtained.

The object of this invention is to provide new chemical substances of the type indicated above. The invention also provides valuable medicinal substances. Thus the bases described and their acid addition salts are valuable as diuretics and spasmolytics. These compounds also show valuable cardiovascular and, particularly, blood pressure reducing activity.

The following examples illustrative in detail certain of the compounds which comprise this invention and methods for producing same. This invention is not to be construed as limited thereby in spirit or in scope. It will be apparent to those skilled in the art that many modifications in materials and methods may be made without departing from the invention. In each of these examples temperatures are given in degrees centigrade (° C.), relative amounts of materials in parts by weight and pressures during vacuum distillations in millimeters (mm.) of mercury.

This application is a continuation-in-part of applicant's copending application, Serial No. 167,266, filed June 9, 1950, now abandoned.

EXAMPLE 1

*N-(β-diethylaminoethyl)-N-cyclohexyl-α-cyclohexylacetamide*

A solution of 160 parts of cyclohexylacetyl chloride and 198 parts of N-diethylaminoethylhexahydroaniline in 2600 parts of benzene is heated at reflux temperature for 5 hours. The reaction mixture is extracted with dilute hydrochloric acid, the extract made alkaline by addition of dilute sodium hydroxide and the base is isolated by ether extraction and evaporation of the solvent. The N-(β-diethylaminoethyl)-N-cyclohexyl-α-cyclohexylacetamide distills at about 190–192° C. at 2 mm. pressure. Treatment of an ether solution of the base with a 25% solution of hydrogen chloride in isopropanol yields the hydrochloride which melts at about 143–144° C. upon recrystallization from ethyl acetate. It has the structural formula

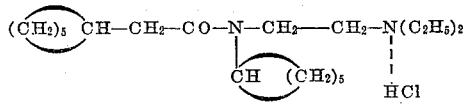

EXAMPLE 2

*N,N-diisopropyl-N'-(3-ethylcyclopentyl)-N'(3-methylcyclopentylacetyl) putrescine*

γ-Diisopropylaminobutyronitrile is prepared by heating diisopropylamine with γ-chlorobutyronitrile for 30 hours in the presence of some potassium iodide, extracting with ether and distilling at 25 mm. pressure and 118–120° C. 120 parts of the nitrile are then stirred with 1200 parts of absolute ethanol and slowly treated with 8 to 10 parts of sodium. The mixture is saturated with dry hydrochloric acid, filtered and fractionated in vacuo. The residue is treated with 50% sodium hydroxide, extracted with benzene, dried and distilled at 25 mm. pressure and about 108–110° C. 350 parts of the resulting N,N-diisopropylputrescine in 250 parts of ethanol are treated with 224 parts of 3-ethylcyclopentanone and 60 parts of Raney nickel in alcoholic suspension. This mixture is hydrogenated in a Parr bomb at 700 lbs. pressure and 110–120° C. for 8 hours. After cooling to room temperature the contents of the bomb are filtered, and vacuum distilled. 268 parts of the residue containing the N,N-diisopropyl-N'-(3-ethylcyclopentyl)putrescine are refluxed with 160 parts of 3-methylcyclopentylacetyl chloride (cf. C. D. Nenitzescu et al., Ber. deut. chem. Ges. 71:2056; 1938) in 3600 parts of benzene for 5 hours. The reaction mixture is extracted with dilute hydrochloric acid and the extract is made alkaline with dilute alkali and extracted with ether. This ether extract is dried over anhydrous potassium carbonate, stirred with charcoal and filtered. The filtrate, on evaporation yields, N,N-diisopropyl - N' - (3 - ethylcyclopentyl) - N' - (3-methylcyclopentylacetyl)putrescine which boils at about 215–225° C. and about 1.5 mm. pressure. The analysis as $C_{25}H_{48}N_2O$ confirms the structure to be

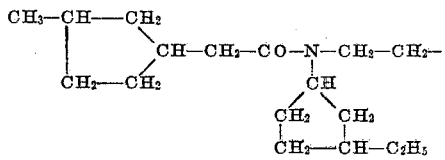

EXAMPLE 3

*N-(β-diethylaminoethyl)-N-cyclohexyl-β-cyclohexylpropionamide*

A solution of 174 parts of β-cyclohexylpropionyl chloride and 198 parts of N-diethylaminoethylhexahydroaniline in 2600 parts of benzene is heated at reflux temperature for 4 hours. The reaction mixture is extracted with dilute hydrochloric acid, the extract is made alkaline and the base is extracted with ether and distilled at about 203–205° C. at 2 mm. pressure. The N-diethylaminoethyl - N - cyclohexyl - β - cyclohexylpropionamide hydrochloride melts at about 117–119° C. upon recrystallization from ethyl acetate. It has the structural formula

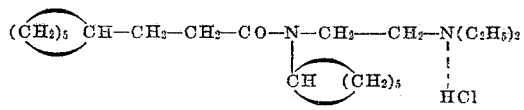

EXAMPLE 4

*N-(δ-dimethylaminobutyl)-N-cyclopentyl-γ-cyclopentylbutyramide*

A solution of 168 parts of cyclopentanone in 200 parts of ethanol is treated with 232 parts of N,N-dimethylputrescine and 50 parts of Raney nickel and the mixture is hydrogenated in a Parr medium pressure bomb for 6 hours at 100–110° C. and about 650 lbs. pressure. After cooling the contents of the bomb are filtered and the filtrate is evaporated. The residue yields N,N-dimethyl-N'-cyclopentylputrescine upon distillation at about 96–104° C. and 7 mm. pressure. A solution of 184 parts of the distillate and 174 parts of cyclopentylpropionyl chloride in 2600 parts of benzene is heated at reflux temperature for 5 hours. The reaction mixture is then extracted with dilute hydrochloric acid. The extract is then made alkaline and the base extracted with ether. This ether extract is dried over anhydrous potassium carbonate, filtered, and evaporated. The N-(δ-dimethylaminobutyl)-N-cyclopentyl-γ-cyclopentylbutyramide is distilled at about 188–194° C. and 2 mm. pressure. It has the structural formula

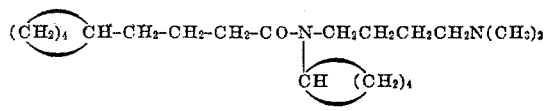

EXAMPLE 5

*N-(β-diethylaminoethyl)-N-cyclohexyl-γ-cyclohexylbutyramide*

188 parts of γ-cyclohexylbutyryl chloride are reacted with 198 parts of N-diethylaminoethylhexahydroaniline in 2600 parts of benzene at refluxing temperature for 4–5 hours. The reaction mixture is extracted with dilute hydrochloric acid and the extract is made alkaline. The base is extracted with ether and distilled at about 210–212° C. at 2 mm. pressure. The N - diethylaminoethyl - N - cyclohexyl - γ - cyclohexylbutyramide is treated with alcoholic hydrogen chloride in dry ether and upon chilling in the ice bath the crystalline hydrochloride is obtained which melts at about 123–125° C. It has the structural formula

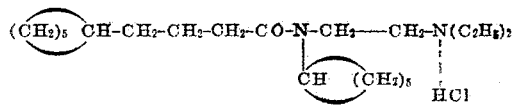

EXAMPLE 6

*N-(β-diethylaminoethyl)-N-cyclohexyl-δ-cyclohexylvaleramide*

202 parts of δ-cyclohexylvaleryl chloride are reacted with 198 parts of N-diethylaminoethylhexahydroaniline in 2600 parts of benzene at reflux temperature for 4–5 hours with mechanical stirring. The resulting mixture is extracted with dilute hydrochloric acid and the extract is made alkaline. The base is extracted with ether and distilled at about 208–210° C. at 1.5 mm. pressure. 150 parts of the N-diethylaminoethyl-N-cyclohexyl-δ-cyclohexylvaleramide are dissolved in dry ether and treated with alcoholic hydrogen chloride. Upon standing at 0° C. the hydrochloride precipitates, which melts at about 88–90° C. It has the structural formula

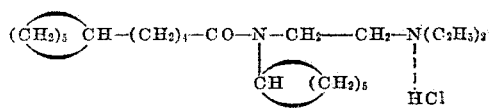

I claim:
1. A compound of the structural formula

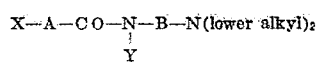

wherein X and Y are lower cycloalkyl radicals, A is a lower alkylene radical and B is a lower alkylene radical separating the 2 nitrogen atoms attached thereto by at least 2 carbon atoms.

2. An amide of the structural formula

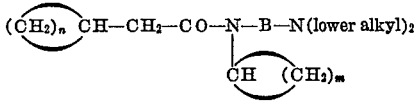

wherein n and m are integers greater than 3 and smaller than 6 and B is a lower alkylene radical separating the 2 nitrogen atoms attached thereto by at least 2 carbon atoms.

3. An amide of the structural formula

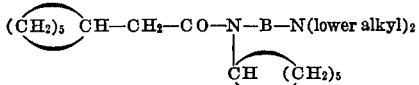

wherein B is a lower alkylene radical separating the 2 nitrogen atoms attached thereto by at least 2 carbon atoms.

4. N - diethylaminoethyl-N-cyclohexyl - α - cyclohexylacetamide.

5. An amide of the structural formula

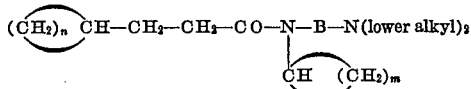

wherein n and m are integers greater than 3 and smaller than 6 and B is a lower alkylene radical separating the 2 nitrogen atoms attached thereto by at least 2 carbon atoms.

6. An amide of the structural formula

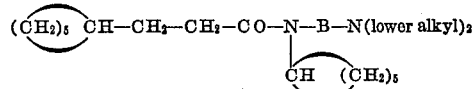

wherein B is a lower alkylene radical separating the 2 nitrogen atoms attached thereto by at least 2 carbon atoms.

7. N - diethylaminoethyl - N - cyclohexyl-β-cyclohexylpropionamide.

8. An amide of the structural formula

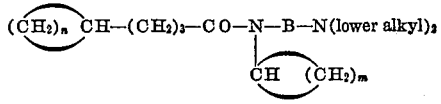

wherein n and m are integers greater than 3 and smaller than 6 and B is a lower alkylene radical separating the 2 nitrogen atoms attached thereto by at least 2 carbon atoms.

9. An amide of the structural formula

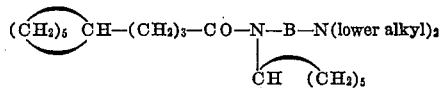

wherein B is a lower alkylene radical separating the 2 nitrogen atoms attached thereto by at least 2 carbon atoms.

10. N-diethylaminoethyl - N - cyclohexyl-γ-cyclohexylbutyramide.

11. the amides of the structural formula

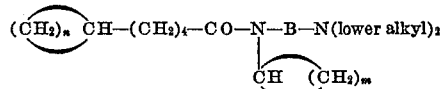

wherein n and m are integers greater than 3 and smaller than 6 and B is a lower alkylene radical separating the 2 nitrogen atoms attached thereto by at least 2 carbon atoms.

12. The compounds of the structural formula

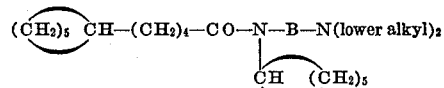

wherein B is a lower alkylene radical separating the 2 nitrogen atoms attached thereto by at least 2 carbon atoms.

13. N-diethylaminoethyl - N - cyclohexyl-δ-cyclohexylvaleramide.

JOHN W. CUSIC.

References Cited in the file of this patent

UNITED STATES PATENTS

| Number | Name | Date |
|---|---|---|
| 2,009,144 | Miescher et al. | July 23, 1935 |

FOREIGN PATENTS

| Number | Country | Date |
|---|---|---|
| 368,590 | Great Britain | Mar. 10, 1932 |
| 464,530 | Great Britain | Apr. 20, 1937 |
| 858,294 | France | May 6, 1940 |

OTHER REFERENCES

Cheney at al.: "J. Am. Chem. Soc.," vol. 64 (1942), pp. 970-3.

Villani et al.: "J. Am. Chem. Soc.," vol. 72, June 1950, pp. 2724-7 (received Oct. 7, 1949).